United States Patent
Farmer et al.

(10) Patent No.: US 6,796,117 B2
(45) Date of Patent: *Sep. 28, 2004

(54) METHOD AND SYSTEM FOR PRECONDITIONING AN EMISSION CONTROL DEVICE FOR OPERATION ABOUT STOICHIOMETRY

(75) Inventors: David George Farmer, Plymouth, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

This patent is subject to a terminal disclaimer.

(21) Appl. No.: 10/264,034

(22) Filed: Oct. 3, 2002

(65) Prior Publication Data

US 2003/0037541 A1 Feb. 27, 2003

Related U.S. Application Data

(63) Continuation of application No. 09/884,557, filed on Jun. 19, 2001, now Pat. No. 6,539,706.

(51) Int. Cl.[7] .................................................. F01N 3/00
(52) U.S. Cl. ............................. 60/285; 60/274; 60/276; 701/109

(58) Field of Search .......................... 60/274, 276, 285, 60/286, 301; 701/109

(56) References Cited

U.S. PATENT DOCUMENTS

| 5,325,664 | A | * | 7/1994 | Seki et al. ..................... 60/276 |
| 5,412,945 | A | * | 5/1995 | Katoh et al. .................. 60/285 |
| 6,003,308 | A | * | 12/1999 | Tsutsumi et al. ............. 60/276 |
| 6,499,294 | B1 | * | 12/2002 | Katoh et al. .................. 60/301 |
| 6,502,389 | B2 | * | 1/2003 | Katayama et al. ............ 60/285 |

FOREIGN PATENT DOCUMENTS

| GB | 2342056 | 4/2000 |
| WO | 98/46868 | 10/1998 |

* cited by examiner

Primary Examiner—Binh Q. Tran
(74) Attorney, Agent, or Firm—Allan J. Lippa

(57) ABSTRACT

An exhaust gas treatment system for an internal combustion engine includes a three-way catalyst and a $NO_x$ device located downstream of the three-way catalyst. The device is preconditioned for emissions reduction at engine operating conditions about stoichiometry by substantially filling the device with oxygen and $NO_x$; and purging stored oxygen and stored $NO_x$ from only an upstream portion of the device, whereupon the upstream portion of the device operates to store oxygen and $NO_x$ during subsequent lean transients while the downstream portion of the device operates to reduce excess HC and CO during subsequent rich transients.

5 Claims, 1 Drawing Sheet

METHOD AND SYSTEM FOR PRECONDITIONING AN EMISSION CONTROL DEVICE FOR OPERATION ABOUT STOICHIOMETRY

This application is a continuation application of U.S. Ser. No. 09/884,557, filed Jun, 19, 2001, now U.S. Pat. No. 6,539,706, having the same assignee as this continuation application, and which is incorporated herein by reference in its entirety.

BACKGROUND OF THE INVENTION

1. Field of the Invention

The invention relates to methods and systems for vehicle exhaust gas treatment to provide reduced vehicle tailpipe emissions when the vehicle's engine is operated lean of stoichiometry.

2. Background Art

The operation of a typical hydrocarbon-fuel, fuel-injected internal combustion engine, as may be found in motor vehicles, results in the generation of engine exhaust gas which includes a variety of constituents including, for example, nitrogen oxides ($NO_x$). The rates at which an engine generates such constituent gases are dependent upon a variety of factors, such as engine operating speed and load, engine temperature, spark timing, and EGR.

In order to comply with modern restrictions regarding permissible levels of tailpipe emissions, the prior art teaches placement of an emission control device in the vehicle exhaust system. The device operates to "store" one or more selected exhaust gas constituents when the exhaust gas is "lean" of stoichiometry, i.e., when ratio of intake air to injected fuel is greater than the stoichiometric air-fuel ratio. The device further operates to "release" at least some of the previously-stored exhaust gas constituents when the exhaust gas is either stoichiometric or "rich" of stoichiometry, i.e., when the ratio of intake air to injected fuel is at or below the stoichiometric air-fuel ratio.

Because continued lean operation of the engine will ultimately "fill up" or saturate the device with the selected exhaust gas constituents, the prior art teaches periodically varying the air-fuel ratio between a nominally lean setting to a rich setting, during which stored constituent gas is released from the device and reduced by the available hydrocarbons in the enriched operating condition. The period during which the exhaust gas constituents are stored in the device is generally referred to as "fill time," while the period during which $NO_x$ is released or "purged" from the device is generally referred to as "purge time." The device fill and purge times must be controlled so as to maximize the benefits of increased fuel efficiency obtained through lean engine operation without concomitantly increasing the output of the constituent gas in the vehicle exhaust emissions.

SUMMARY OF THE INVENTION

It is an object of the invention to provide a method and system for controlling the exhaust gas emissions of an internal combustion engine which capitalizes upon the presence of an exhaust emission control device to enhance emissions reduction when operating the engine using near-stoichiometric air-fuel mixtures.

Under the invention, an emission control device is preconditioned so that the device can operate to efficiently remove exhaust gas constituents, such as HC, CO and $NO_x$, during a subsequent closed-loop, near-stoichiometric engine operation, and to better tolerate brief lean or rich transients. The device is preconditioned by oxidizing/reducing only the oxygen and the exhaust gas constituent(s) which have been previously stored in an upstream portion of the device during a lean engine operating condition, thereby leaving some oxygen and exhaust-gas constituents stored in the device's downstream portion. The oxygen and exhaust gas constituents remaining in the downstream portion of the preconditioned device permit the device to act like a typical catalytic emission control device to thereby provide higher emissions reduction during closed-loop operation near stoichiometry. Thus, for example, if some oxygen and $NO_x$ remain within the downstream portion of the preconditioned device, any excess HC and/or CO produced during the subsequent near-stoichiometric engine operating condition will be accommodated by the remaining oxygen and $NO_x$ in the downstream portion of the preconditioned device. Similarly, excess $NO_x$ generated in the subsequent near-stoichiometric engine operating condition will be stored in the upstream portion of the device.

In accordance with the invention, when the device is to be preconditioned for subsequent engine operation about stoichiometry, the engine is operated at a first engine operating condition characterized by combustion of a first air-fuel mixture having a first air-fuel ratio lean of the stoichiometric air-fuel ratio is employed to substantially "fill" or saturate the device's media with oxygen and the selected exhaust gas constituent(s), such as $NO_x$. The engine is then operated at a second operating condition characterized by combustion of a second air-fuel mixture having a second air-fuel ratio rich of the stoichiometric air-fuel ratio. The second operating condition is continued until excess hydrocarbons have "broken through" the upstream portion of the device's media, whereupon the engine is operated at a third operating condition characterized by closed-loop variation of the air-fuel mixture supplied to the engine about the stoichiometric air-fuel mixture.

In accordance with another feature of the invention, in a preferred embodiment, a sensor, positioned within the device between the upstream portion and the downstream portion, generates an output signal representing the concentration of oxygen in the exhaust gas flowing through the device at a position within the device between the upstream portion and the downstream portion. The sensor output signal is used to determine the time period during which the engine is operated at the second operating condition, for example, by comparing the sensor output signal with a reference value. The second time period is further preferably adjusted to reflect the amount of fuel, in excess of the stoichiometric amount when operating at the second air-fuel ratio, which is already in the exhaust system, between the engine and the mid-device sensor, at the time that the sensor's output signal indicates the presence of excess hydrocarbons in the exhaust gas flowing through the device.

Most preferably, and in accordance with another feature of the invention, the oxygen sensor is itself positioned longitudinally within the device to accommodate the excess fuel that is already in the exhaust system, upstream of the device, when the sensor's output signal indicates the presence of excess hydrocarbons in the device, thereby simplifying the control process for preconditioning the device.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
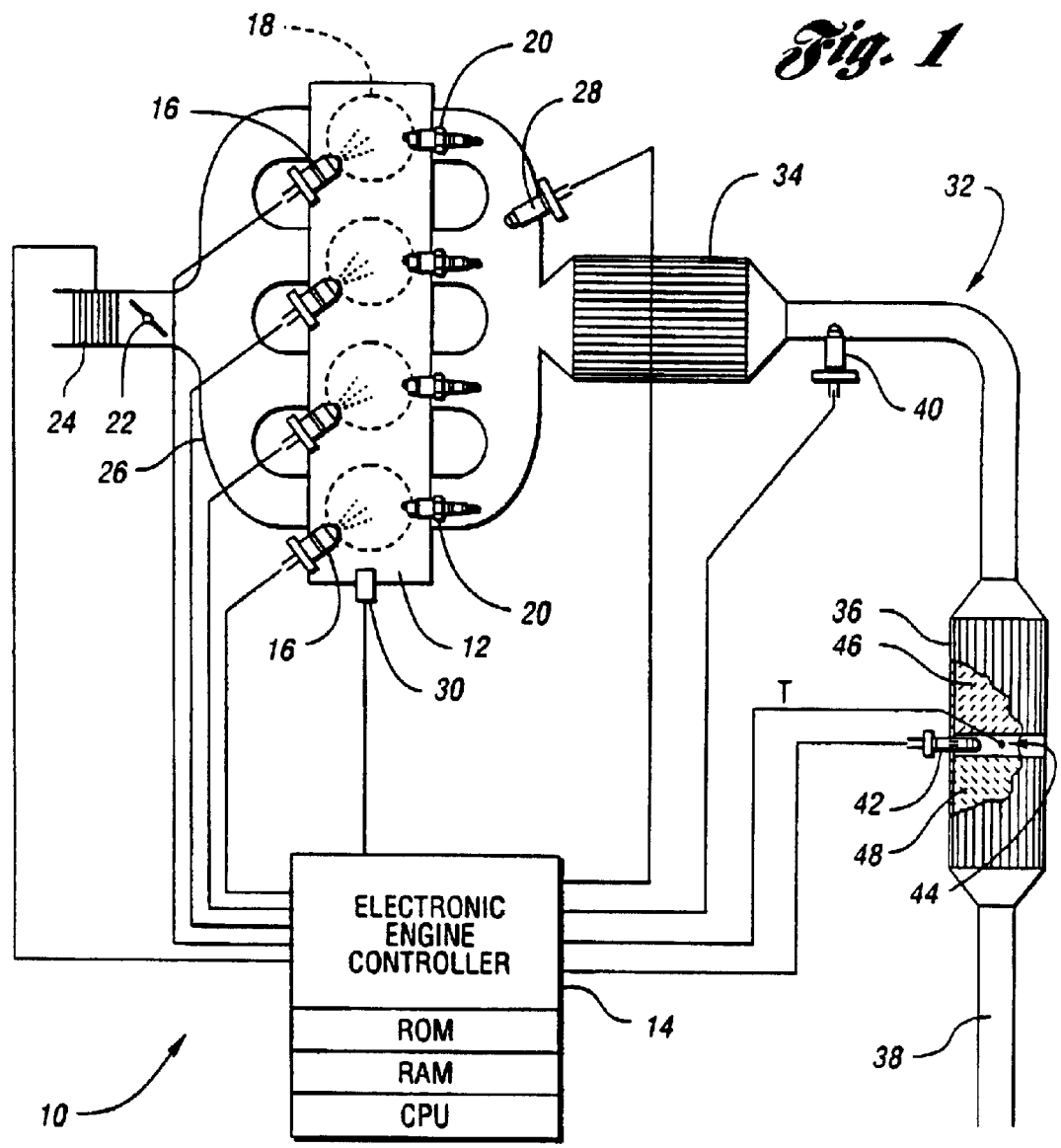
FIG. 1 is a schematic of an exemplary system for practicing the invention.

Referring to FIG. 1, an exemplary control system 10 for a four-cylinder, direct-injection, spark-ignition, gasoline-powered engine 12 for a motor vehicle includes an electronic engine controller 14 having ROM, RAM and a processor ("CPU") as indicated. The controller 14 controls the operation of a set of fuel injectors 16. The fuel injectors 16, which are of conventional design, are each positioned to inject fuel into a respective cylinder 18 of the engine 12 in precise quantities as determined by the controller 14. The controller 14 similarly controls the individual operation, i.e., timing, of the current directed through each of a set of spark plugs 20 in a known manner.

The controller 14 also controls an electronic throttle 22 that regulates the mass flow of air into the engine 12. An air mass flow sensor 24, positioned at the air intake of engine's intake manifold 26, provides a signal regarding the air mass flow resulting from positioning of the engine's throttle 22. The air flow signal from the air mass flow sensor 24 is utilized by the controller 14 to calculate an air mass value which is indicative of a mass of air flowing per unit time into the engine's induction system.

A first oxygen sensor 28 coupled to the engine's exhaust manifold detects the oxygen content of the exhaust gas generated by the engine 12 and transmits a representative output signal to the controller 14. The first oxygen sensor 28 provides feedback to the controller 14 for improved control of the air-fuel ratio of the air-fuel mixture supplied to the engine 12, particularly during operation of the engine 12 at or near the stoichiometric air-fuel ratio which, for a constructed embodiment, is about 14.65. A plurality of other sensors, including an engine speed sensor and an engine load sensor, indicated generally at 30, also generate additional signals in a known manner for use by the controller 14.

An exhaust system 32 transports exhaust gas produced from combustion of an air-fuel mixture in each cylinder 18 through a pair of catalytic emission control devices 34,36 and out the vehicle tailpipe 38. A second oxygen sensor 40, which may also be a switching-type HEGO sensor, is positioned in the exhaust system 32 between the first and second devices 34,36.

In accordance with the invention, a third oxygen sensor 42 is positioned within a gap 44 defined within the second device 36 in between two media "bricks" 46,48 of approximately equal $NO_x$-storing capacity. A mid-device temperature sensor (not shown) generates an output signal T representative of the current temperature of the device 36.

In operation, when the second device 36 is to be preconditioned for subsequent engine operation about stoichiometry, the controller 14 selects a first engine operating condition characterized by combustion of a first air-fuel mixture having a first air-fuel ratio lean of the stoichiometric air-fuel ratio. The first operating condition is identified by reference numeral 60 in FIG. 2. The controller 14 maintains the first engine operating condition for a first time period, such that the excess oxygen and generated $NO_x$ present in the exhaust gas substantially "fills" or saturates the second device's upstream and downstream bricks 46,48 with oxygen and $NO_x$. The first time period, also known as the second device "fill" time, is determined in any suitable manner, for example, through use of a cumulative measure of oxygen and $NO_x$ stored in the second device 36 based, in part, upon instantaneous values of engine-generated feedgas $NO_x$.

After transitioning from the first engine operating condition to a stoichiometric air-fuel mixture (the transition being identified by reference numeral 62 in FIG. 2), the controller 14 then selects a second operating condition characterized by combustion of a second air-fuel mixture having a second air-fuel ratio rich of the stoichiometric air-fuel ratio. The second operating condition is identified by reference numeral 64 in FIG. 2. The second operating condition is continued for a second time period, for example, until the output signal generated by the mid-device sensor 42 indicates that excess hydrocarbons have "broken through" the upstream brick 46. By way of example only, in a preferred embodiment, the second time period is determined by comparing the output signal generated by the mid-device sensor 42 with a predetermined reference value.

The presence of excess hydrocarbons within the second device 36 between its upstream and downstream bricks 46,48 confirms that the upstream brick 46 has been purged of substantially all oxygen and $NO_x$ which were previously stored in the upstream brick 46 during the first operating condition. And, by discontinuing the enriched second operating condition upon the detection of excess hydrocarbons mid-way through the device 36, the invention ensures that an amount of stored oxygen and, particularly, stored $NO_x$ remains in the second device's downstream brick 48.

Figure 2:
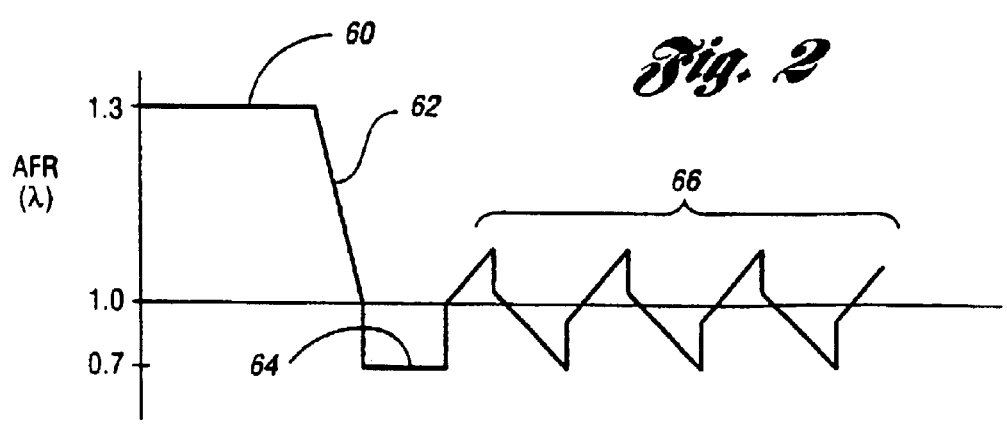
FIG. 2 is a plot illustrating the air-fuel ratios of the air-fuel mixture supplied to the engine during device preconditioning and subsequent engine operation about stoichiometry.

The controller 14 then selects a third engine operating condition, indicated by reference numeral 66 in FIG. 2, characterized by closed-loop variation of the air-fuel mixture supplied to the engine 12 about the stoichiometric air-fuel mixture. Specifically, while the invention contemplates use of a wide variety of control processes by which the air-fuel ratio employed during the third operating condition varies about the stoichiometric air-fuel ratio, the third operating condition is generally characterized by exhaust gas which lacks an amount of excess hydrocarbons sufficient to purge substantially all oxygen and $NO_x$ stored in the downstream brick 48, and which lacks an amount of excess oxygen sufficient to substantially fill the upstream brick 46 with oxygen and $NO_x$.

In accordance with another feature of the invention, in a preferred embodiment, the relative $NO_x$-storing capacity of the upstream and downstream bricks 46,48, and/or the longitudinal position of the oxygen sensor 42 within the second device 36, is preferably selected such that the output signal generated by the oxygen sensor 42 may itself be used to define the end of the second time period (during which the second device 36 is only partially purged of stored oxygen and stored $NO_x$). Alternatively, the invention contemplates adapting the second time period, as otherwise defined by the output signal of the sensor 42, by an adaption factor which accounts for the amount of fuel, in excess of the stoichiometric amount when operating at the second air-fuel ratio, which is already in the exhaust system, between the engine 12 and the mid-device oxygen sensor 42, at the time that the sensor's output signal indicates the presence of excess hydrocarbons in the exhaust gas flowing through the device 36.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while the exemplary exhaust gas treatment system described above includes a pair of HEGO sensors 28,38, the invention contemplates use of other suitable sensors for generating a signal representative of the oxygen concentration in the exhaust manifold and exiting the three-way catalyst 32, respectively, including but not limited to exhaust gas oxygen (EGO) type sensors, and linear-type sensors such as universal exhaust gas oxygen (UEGO) sensors.

What is claimed is:

1. A method for preconditioning an emission control device receiving exhaust gas generated by an internal combustion engine, the method comprising:

operating the engine at a first operating condition, characterized by combustion of a first air-fuel mixture to the engine having a first air-fuel ratio lean of a stoichiometric air-fuel ratio, for a first time period sufficient to store a substantial amount of oxygen and a constituent of the exhaust gas in both an upstream portion of the device and a downstream portion of the device operating the engine at a second operating condition, characterized by combustion of a second air-fuel mixture to the engine having a second air-fuel ratio rich of the stoichiometric air-fuel ratio, for a second time period sufficient to release substantial amounts of stored oxygen and the stored constituent from only the upstream portion of the device; and discontinuing the second operating condition at the end of the second time period and then operating the engine about stoichiometry.

2. The method of claim 1, wherein discontinuing includes operating the engine at a third operating condition for a third time period, the third operating condition being characterized by combustion of a third air-fuel mixture having a time-varying range of air-fuel mixtures including air-fuel ratios that are both lean and rich of the stoichiometric air-fuel ratio, the third operating condition being further characterized by exhaust gas lacking an amount of excess hydrocarbons sufficient to purge substantially all oxygen and constituent stored in the downstream portion of the device during the first operating condition, and lacking an amount of excess oxygen sufficient to substantially fill the upstream portion of the device with oxygen and the constituent.

3. The method of claim 2, wherein determining the second time period includes comparing an amplitude of the output signal of the sensor to a predetermined reference value.

4. The method of claim 3, including determining an amount of fuel, in excess of a stoichiometric amount of fuel, supplied to the engine during the second operating condition, and adjusting the second time period based on the determined amount of fuel.

5. The method of claim 1, wherein said second time period is calculated based on a concentration of oxygen in exhaust gas flowing through the device at a position within the device between the upstream portion of the device and the downstream portion of the device.

* * * * *